CROW & SANDERSON.
Fruit Drier.
No. 77,362. Patented April 28, 1868.
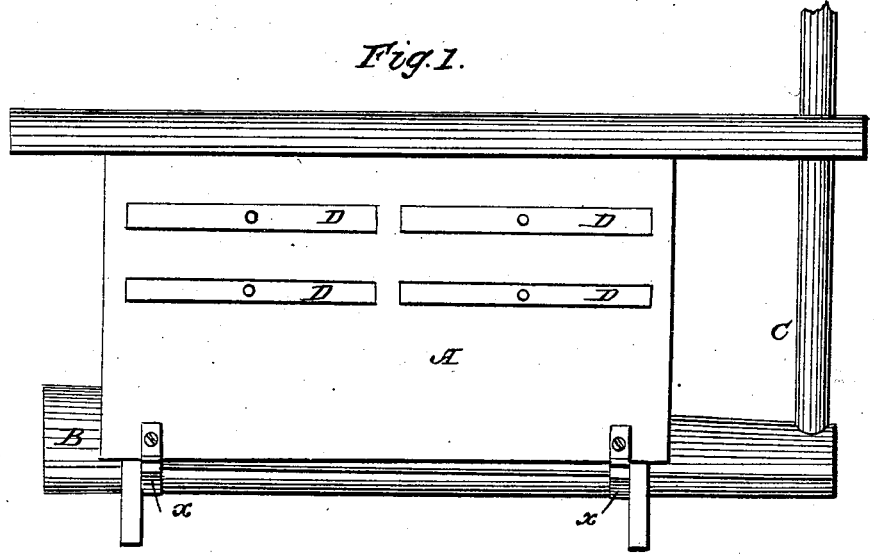
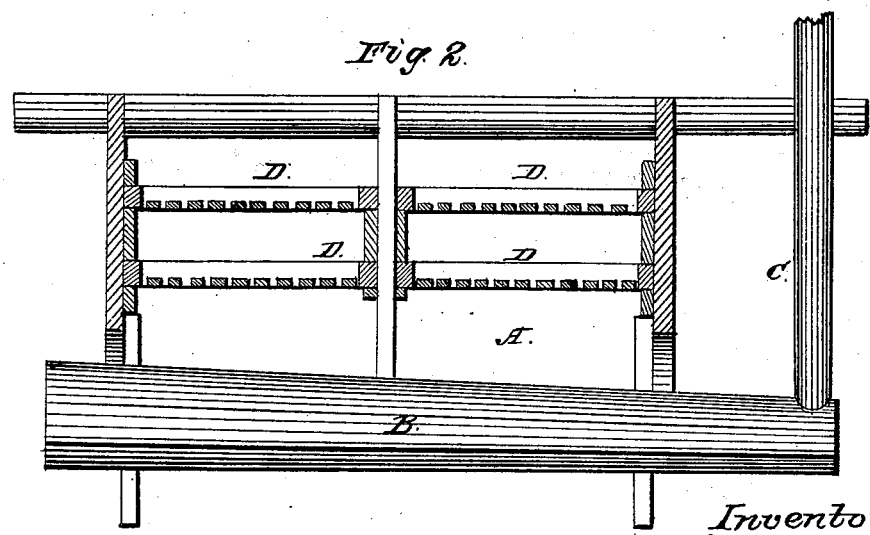

United States Patent Office.

L. J. CROW AND G. SANDERSON, OF FREDERICKSBURG, OHIO.

Letters Patent No. 77,362, dated April 28, 1868.

IMPROVEMENT IN DRIERS.

The Schedule referred to in these Letters Patent and making part of the same.

TO ALL WHOM IT MAY CONCERN:

Be it known that we, L. J. CROW and G. SANDERSON, of Fredericksburg, in the county of Wayne, and in the State of Ohio, have invented certain new and useful Improvements in Fruit-Driers; and do hereby declare that the following is a full, clear, and exact description thereof, reference being had to the accompanying drawings, and the letters of reference marked thereon.

In the annexed drawings, making a part of this specification, A represents a rectangular box or house, provided with suitable legs as shown, and B represents a fire-box or furnace, made in two parts, the bottom being slightly curved, and the top cylindrical, or nearly so. Both parts are provided with lips or flanges, and are riveted together through said lips.

The furnace B is made tapering toward the back end thereof, for the purpose of equalizing the heat in the different parts of the box A. Said furnace is made of sheet metal, and suspended beneath the box A by means of suitable metallic straps $x\ x$. When the box or house is made of wood, metallic strips are tacked on the bottom of the sides thereof, which extend almost to the side of the furnace, leaving a crack or opening for a free passage of air upward through the box A.

Between the roof or top of the box A and its sides are also grooves, to allow the heated air and steam from the fruit to pass away.

$c$ represents a smoke-pipe, extending from the rear end of the furnace up through the top of the box A, as is fully shown.

D D represent drawers, the bottoms of which are composed of a series of parallel slats, tacked on at any required distance apart. These drawers D are adjusted across the box A, above the furnace, in any convenient manner, and at any distance from the furnace. By placing fruit of any kind, properly prepared, in the drawers D D, and building and keeping a fire in the furnace, the same can be perfectly and completely dried in about twelve hours.

The box A may be made of any material desired, and is light, so that it may be moved from place to place without difficulty.

Having thus fully described our invention, what we claim as new, and desire to secure by Letters Patent, is—

The metallic furnace B, when made cylindrical on its upper face, and tapering from its mouth to the smoke-pipe C, and arranged under the box A, with its drawers and ventilating-openings, whereby the flow of heat to the fruit is equally distributed, in the manner as specified.

In testimony that we claim the foregoing, we have hereunto set our hands and seals, this 24th day of January, 1868.

L. J. CROW. [L. S.]
G. SANDERSON. [L. S.]

Witnesses:
J. F. SCOTT,
W. S. PEPPARD.